US012671815B2

(12) United States Patent
Ahn et al.

(10) Patent No.: US 12,671,815 B2
(45) Date of Patent: Jun. 30, 2026

(54) FEATURE MAP COMPRESSION METHOD AND APPARATUS

(71) Applicant: INTELLECTUAL DISCOVERY CO., LTD., Seoul (KR)

(72) Inventors: Yongjo Ahn, Seoul (KR); Jongseok Lee, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 18/839,004

(22) PCT Filed: Feb. 17, 2023

(86) PCT No.: PCT/KR2023/002344
§ 371 (c)(1),
(2) Date: Aug. 15, 2024

(87) PCT Pub. No.: WO2023/158267
PCT Pub. Date: Aug. 24, 2023

(65) Prior Publication Data
US 2025/0159177 A1      May 15, 2025

(30) Foreign Application Priority Data

Feb. 18, 2022     (KR) ........................ 10-2022-0021743
Feb. 18, 2022     (KR) ........................ 10-2022-0021744

(51) Int. Cl.
*H04N 19/13*          (2014.01)
*H04N 19/119*         (2014.01)
(Continued)

(52) U.S. Cl.
CPC ........... *H04N 19/13* (2014.11); *H04N 19/119* (2014.11); *H04N 19/124* (2014.11);
(Continued)

(58) Field of Classification Search
CPC .... H04N 19/13; H04N 19/119; H04N 19/124; H04N 19/136; H04N 19/176;
(Continued)

(56) References Cited

U.S. PATENT DOCUMENTS

2021/0211733 A1     7/2021  Aksu et al.
2022/0295116 A1*    9/2022  Ma ........................ H04N 19/117
(Continued)

FOREIGN PATENT DOCUMENTS

KR     10-2019-0110068  A      9/2019
KR     10-2020-0134155  A     12/2020
(Continued)

OTHER PUBLICATIONS

International Search Report & Written Opinion for PCT/KR2023/002344 by Korean Intellectual Property Office dated May 26, 2023.

*Primary Examiner* — Nasim N Nirjhar
(74) *Attorney, Agent, or Firm* — BROADVIEW IP LAW, PC

(57) ABSTRACT

A neural network-based image processing method and apparatus according to an embodiment of the present invention may: acquire a feature tensor from an input image by using a first neural network including a plurality of neural network layers; acquire a symbol tensor by performing quantization on the acquired feature tensor; and generate a bitstream by performing entropy encoding on the basis of the symbol tensor.

14 Claims, 12 Drawing Sheets

(51) Int. Cl.
  *H04N 19/124*    (2014.01)
  *H04N 19/136*    (2014.01)
  *H04N 19/176*    (2014.01)
  *H04N 19/42*    (2014.01)

(52) U.S. Cl.
  CPC ......... *H04N 19/136* (2014.11); *H04N 19/176*
    (2014.11); *H04N 19/42* (2014.11)

(58) Field of Classification Search
  CPC ........ H04N 19/42; H04N 19/70; H04N 19/96;
      H04N 19/91; G06N 3/045; G06N 3/08;
      G06N 5/04; G06T 9/00; G06T 9/002;
            G06T 2207/20084
  See application file for complete search history.

(56)            References Cited

U.S. PATENT DOCUMENTS

2023/0396801 A1*  12/2023  Racape .................. H04N 19/42
2025/0131693 A1*   4/2025  Ji ........................... H04N 19/86

FOREIGN PATENT DOCUMENTS

KR     10-2021-0136476 A    11/2021
WO        2021/260269 A1    12/2021

* cited by examiner

SYMBOL TENSOR

FEATURE MAP COMPRESSION METHOD AND APPARATUS

CROSS-REFERENCE TO RELATED APPLICATIONS

This application is a National Phase Entry Application of PCT Application No. PCT/KR2023/002344, filed on Feb. 17, 2023, which claims priority to Korean Patent Application No. 10-2022-0021743, filed on Feb. 18, 2022, and Korean Patent Application No. 10-2022-0021744, filed on Feb. 18, 2022, in the Korean Intellectual Property Office, the entire contents of which are hereby incorporated by reference in its entirety.

TECHNICAL FIELD

The present invention relates to a method and device for compressing a feature map, and more specifically, to a method and device for compressing a feature map using video compression.

BACKGROUND ART

Video images are compressed and encoded by removing spatial-temporal redundancy and inter-view redundancy, and can be transmitted through communication lines or stored in a suitable form on a storage medium.

DISCLOSURE

Technical Problem

The present invention proposes a method and device for compressing a feature tensor, which is an intermediate result of a neural network, using skip coding.

The present invention proposes a method and device for coding feature data using a partition structure having various hierarchical structures.

Technical Solution

In order to solve the above problems, a method and device for performing inference and image encoding/decoding using a neural network are provided. Additionally, to solve the above problems, an inference method and device using video compression are provided.

A neural network-based image processing method and device according to an embodiment of the present invention may obtain a feature tensor from an input image using a first neural network including a plurality of neural network layers, obtain a symbol tensor by performing quantization on the obtained feature tensor, and generate a bitstream by performing entropy encoding based on the symbol tensor.

The neural network-based image processing method and device according to an embodiment of the present invention may selectively perform the entropy encoding by applying skip coding to the symbol tensor.

In the neural network-based image processing method and device according to an embodiment of the present invention, when the skip coding is applied to the symbol tensor, entropy encoding may be skipped on all or part of a plurality of symbols included in the symbol tensor.

The neural network-based image processing method and device according to an embodiment of the present invention may determine whether to apply the skip coding to the symbol tensor.

In the neural network-based image processing method and device according to an embodiment of the present invention, whether to apply the skip coding may be determined based on the structure of the first neural network, the type of the first layer from which the feature tensor is output, the type of the second layer indicating the next layer of the first layer based on the encoding order, or the symbol included in the symbol tensor.

In the neural network-based image processing method and device according to an embodiment of the present invention, when the type of the second layer is a summation layer, it may be determined to apply the skip coding to the symbol tensor.

In the neural network-based image processing method and device according to an embodiment of the present invention, when the type of the first layer is not an upsampling layer and the type of the second layer is a summation layer, it may be determined to apply the skip coding to the symbol tensor.

In the neural network-based image processing method and device according to an embodiment of the present invention, whether to apply the skip coding may be determined using a second neural network including a plurality of neural network layers.

The neural network-based image processing method and device according to an embodiment of the present invention may determine whether to apply the skip coding to each of a plurality of channels included in the symbol tensor.

In the neural network-based image processing method and device according to an embodiment of the present invention, when it is determined that the skip coding is applied to the current channel among the plurality of channels included in the symbol tensor, entropy encoding may be performed on the skip coding flag indicating that the skip coding is applied to the current channel.

In the neural network-based image processing method and device according to an embodiment of the present invention, when it is determined that the skip coding is not applied to the current channel, whether to apply the skip coding may be determined for each of the plurality of blocks included in the current channel.

In the neural network-based image processing method and device according to an embodiment of the present invention, a plurality of blocks included in the current channel may have a predefined fixed size.

In the neural network-based image processing method and device according to an embodiment of the present invention, the feature tensor may represent data expressed in floating-point, and the symbol tensor may represent data expressed in fixed-point.

In the neural network-based image processing method and device according to an embodiment of the present invention, the feature tensor may be partitioned into a plurality of processing units based on a predefined partitioning structure, and the predefined partitioning structure may include at least one of an octree partitioning structure, a point unit partitioning structure, a channel unit partitioning structure, or a hierarchical partitioning structure.

Technical Effects

Video signal coding efficiency can be improved through the feature map compression method and device according to the present invention.

Additionally, the coding efficiency of feature map compression can be improved by applying the feature tensor skip coding method proposed in the present invention.

In addition, coding efficiency can be improved by using the feature partition method using various hierarchical structures proposed in the present invention.

DESCRIPTION OF DIAGRAMS

BEST MODE

Figure 1:
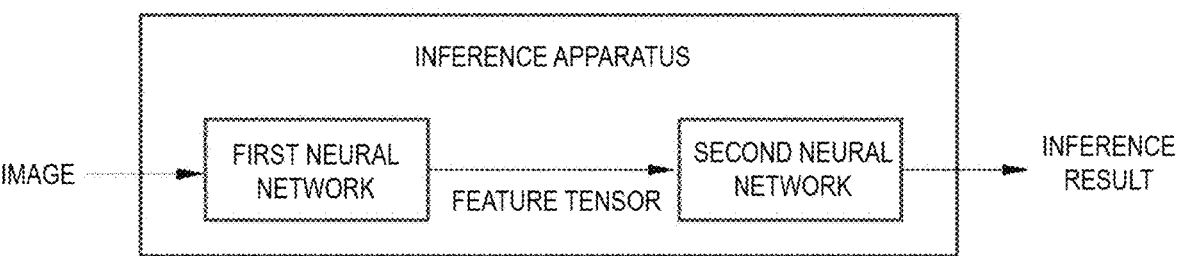
FIG. 1 is a block diagram showing an example of a neural network-based inference apparatus according to an embodiment of the present disclosure.

A neural network-based image processing method and device according to an embodiment of the present invention may obtain a feature tensor from an input image using a first neural network including a plurality of neural network layers, obtain a symbol tensor by performing quantization on the obtained feature tensor, and generate a bitstream by performing entropy encoding based on the symbol tensor.

The neural network-based image processing method and device according to an embodiment of the present invention may selectively perform the entropy encoding by applying skip coding to the symbol tensor.

In the neural network-based image processing method and device according to an embodiment of the present invention, when the skip coding is applied to the symbol tensor, entropy encoding may be skipped on all or part of a plurality of symbols included in the symbol tensor.

The neural network-based image processing method and device according to an embodiment of the present invention may determine whether to apply the skip coding to the symbol tensor.

In the neural network-based image processing method and device according to an embodiment of the present invention, whether to apply the skip coding may be determined based on the structure of the first neural network, the type of the first layer from which the feature tensor is output, the type of the second layer indicating the next layer of the first layer based on the encoding order, or the symbol included in the symbol tensor.

In the neural network-based image processing method and device according to an embodiment of the present invention, when the type of the second layer is a summation layer, it may be determined to apply the skip coding to the symbol tensor.

In the neural network-based image processing method and device according to an embodiment of the present invention, when the type of the first layer is not an upsampling layer and the type of the second layer is a summation layer, it may be determined to apply the skip coding to the symbol tensor.

In the neural network-based image processing method and device according to an embodiment of the present invention, whether to apply the skip coding may be determined using a second neural network including a plurality of neural network layers.

The neural network-based image processing method and device according to an embodiment of the present invention may determine whether to apply the skip coding to each of a plurality of channels included in the symbol tensor.

In the neural network-based image processing method and device according to an embodiment of the present invention, when it is determined that the skip coding is applied to the current channel among the plurality of channels included in the symbol tensor, entropy encoding may be performed on the skip coding flag indicating that the skip coding is applied to the current channel.

In the neural network-based image processing method and device according to an embodiment of the present invention, when it is determined that the skip coding is not applied to the current channel, whether to apply the skip coding may be determined for each of the plurality of blocks included in the current channel.

In the neural network-based image processing method and device according to an embodiment of the present invention, a plurality of blocks included in the current channel may have a predefined fixed size.

In the neural network-based image processing method and device according to an embodiment of the present invention, the feature tensor may represent data expressed in floating-point, and the symbol tensor may represent data expressed in fixed-point.

In the neural network-based image processing method and device according to an embodiment of the present invention, the feature tensor may be divided into a plurality of processing units based on a predefined partition structure, and the predefined partition structure may include at least one of a octree partition structure, a point unit partition structure, a channel unit partition structure, or a hierarchical partition structure.

[Mode]

An embodiment of the present disclosure will be described in detail so that those skilled in the art may easily implement it by referring to a drawing attached to this specification. But, the present disclosure may be implemented in different forms and it is not limited to an embodiment described herein. And, a part irrelevant to a description is omitted to clearly describe the present disclosure in a drawing and a similar reference numeral is attached to a similar part throughout this specification.

Throughout this specification, when a part is referred to as being 'connected' to other part, it may include an electrical connection that other element presents therebetween as well as a direct connection.

In addition, when a part is referred to as 'including' a component throughout this specification, it means other component may be further included without excluding other component unless otherwise opposed.

In addition, a term such as first, second, etc. may be used to describe a variety of components, but the components should not be limited by the terms. The terms are used only to distinguish one component from other component.

In addition, for an embodiment about a device and a method described in this specification, some configurations of a device or some steps of a method may be omitted. In addition, order of some configurations of a device or some steps of a method may be changed. In addition, other configuration or other step may be inserted into some configurations of a device or some steps of a method.

In addition, some configurations or some steps of a first embodiment of the present disclosure may be added to a second embodiment of the present disclosure or may substitute some configurations or some steps of a second embodiment.

In addition, construction units shown in an embodiment of the present disclosure are independently shown to represent different characteristic functions, and they do not mean that each construction unit is configured with separated hardware or one software construction unit. In other words, each construction unit is described by being enumerated as each construction unit for convenience of a description and at least two construction units of each construction unit may be combined to form one construction unit or one construction unit may be partitioned into a plurality of construction units to perform a function. An integrated embodiment and separated embodiment of each construction unit are also included in a scope of a right of the present disclosure unless they are departing from the spirit of the present disclosure.

First, terms used in this application may be briefly described as follows.

A decoding device (Video Decoding Apparatus) to be described later may be a device included in a server terminal such as a civil security camera, a civil security system, a military security camera, a military security system, a personal computer (PC), a notebook computer, a portable multimedia player (PMP), a wireless communication terminal, a smart phone, a TV application server and a service server, etc. and it may mean a variety of devices equipped with a user terminal including equipment of every kind, a communication device including a communication modem, etc. for communication with a wired/wireless communication network, a memory for storing various kinds of programs and data for decoding an image or performing intra or inter prediction for decoding, a microprocessor for executing a program and performing operation and control and others.

In addition, an image encoded as a bitstream by an encoder may be transmitted to an image decoding device, decoded and reconstructed and reproduced as an image through a variety of communication interface such as a cable, an universal serial bus (USB), etc. or through a wired or wireless communication network, etc. such as the Internet, a wireless local area network, a wireless LAN network, a Wi-Bro network, a mobile communication network, etc. in real time or in non-real time. Alternatively, a bitstream generated by an encoder may be stored in a memory. The memory may include both a volatile memory and a non-volatile memory. In this specification, a memory may be expressed as a recoding medium storing a bitstream.

Commonly, a video may be configured with a series of pictures and each picture may be partitioned into coding units like a block. In addition, a person with ordinary skill in the art to which this embodiment pertains may understand that a term of picture entered below may be used by being substituted with other term having the same meaning as an image, a frame, etc. And, a person with ordinary skill in the art to which this embodiment pertains may understand that a term of coding unit may be used by being substituted with other term having the same meaning as a unit block, a block, etc.

Hereinafter, in reference to attached drawings, an embodiment of the present disclosure is described in more detail. In describing the present disclosure, an overlapping description is omitted for the same component.

FIG. 1 is a block diagram showing an example of a neural network-based inference apparatus according to an embodiment of the present disclosure.

According to an embodiment of the present disclosure, a neural network-based inference apparatus (hereinafter referred to as an inference apparatus) may receive an image as input and output an inference result. In this case, the input image may be data such as an image, video, point cloud, or mesh, or may be an image that has been preprocessed before being input to the inference apparatus. Likewise, the inference result may be data such as an image, video, point cloud, or mesh. As an example, the inference result may be an image or video classification result. Alternatively, as an example, the inference result may be location information or size information of an object within an image or video.

Referring to FIG. 1, the inference apparatus may include one or more neural networks. As an example, as shown in the example of FIG. 1, the inference apparatus may include a first neural network and a second neural network. The inference apparatus shown in FIG. 1 is an example, and embodiments of the present disclosure are not limited thereto. For example, the inference apparatus may additionally include another neural network or another processor in addition to the first neural network and the second neural network. Additionally, the first neural network and the second neural network are shown as separate and independent configurations, but may also be implemented as a single configuration.

Each neural network may include a plurality of neural network layers. In this case, the neural network layers may include at least one of a convolution layer, a deconvolution layer, a transposed convolution layer, a dilated convolution layer, a grouped convolution layer, a graph convolution layer, an average pooling layer, a max pooling layer, an up sampling layer, a down sampling layer, a pixel shuffle layer, a channel shuffle layer, a batch normalization layer, a weight normalization layer, or a generalized normalization layer.

As an example, a neural network layer may be a layer that performs a convolution operation, such as a convolution layer, a transposed convolution layer, a grouped convolution layer, a graph convolution layer, etc. Alternatively, a neural network layer may refer to an activation function such as sigmoid, ReLU (Rectified Linear Unit), etc. Alternatively, the neural network layer may be a layer that performs general operations such as summation, subtraction, and multiplication. Alternatively, the neural network layer may be a batch normalization layer, a weight normalization layer, or a generalization normalization layer that normalizes the tensor. Alternatively, the neural network layer may be a layer such as upsampling or downsampling. Alternatively, the neural network layer may be a pooling layer or an activation layer.

The first neural network may receive an image as input and output a feature tensor. Here, the feature tensor may refer to one-dimensional or more data generated from a neural network. Additionally, one or more feature tensors may be output. In this disclosure, a feature tensor may represent a feature map. Alternatively, one or more feature tensors output from a neural network may be referred to as a feature map. In this case, multiple feature tensors may have different spatial resolutions. Alternatively, multiple feature tensors having the same channel with different spatial resolutions may be generated. The generated one or more feature tensors may be transmitted to a second neural network.

The second neural network may receive one or multiple feature tensors as input and output inference results. As an example, the inference result may be a reconstructed image. Alternatively, as an example, the inference result may be the location of a rectangular box (or block) in two-dimensional or three-dimensional space, such as the result of object detection. Alternatively, the inference result may be a mask representing the object area in two-dimensional space. Alternatively, the inference result may mean probability values for multiple objects. Alternatively, the inference result may refer to various results generally used for machine vision.

Neural networks may generally be used in a variety of applications such as image classification, image recontruction, image partition, object recognition, and object tracking. Therefore, the neural network according to this embodiment may be trained to receive images as input and infer results suitable for each application.

In one embodiment of the present invention, the first neural network or the second neural network may include a graph convolution layer. The convolution layer may extract features of the image and generate (or update) a feature map based on the extracted features. The graph convolution layer represents a convolution layer that extracts features based on graph data. Graph data may include a plurality of node information (vertex information) and/or connection information between a plurality of nodes (edge information). As an example, a wavelet transform may be used in the graph convolution layer. As an example, a graph-based wavelet transform may be used in a graph convolution layer. Graph-based wavelet transform may be referred to as lifting transform. As an example, the first neural network may use wavelet transform and lifting transform, and the second neural network may use inverse wavelet transform and inverse lifting transform.

Figure 2:
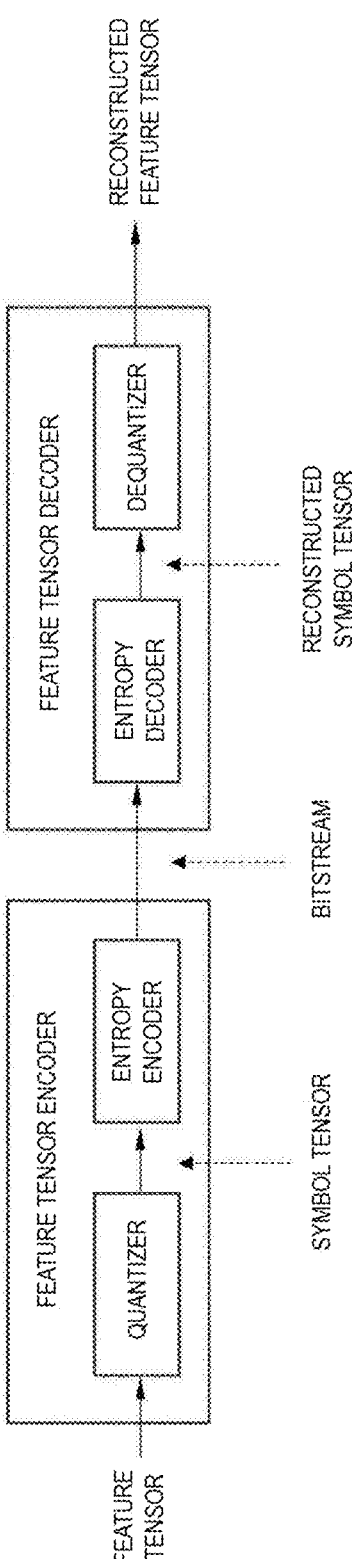
FIG. 2 is a block diagram showing an example of a feature tensor encoder and decoder according to an embodiment of the present disclosure.

FIG. 2 is a block diagram showing an example of a feature tensor encoder and decoder according to an embodiment of the present disclosure.

Referring to FIG. 2, the feature tensor encoder may receive a feature tensor as input and output a bitstream. The feature tensor encoder may include a quantizer and an entropy encoder. The feature tensor encoder shown in FIG. 2 is an example, and embodiments of the present disclosure are not limited thereto. For example, the feature tensor encoder may include other processor or other configurations in addition to the quantizer and the entropy encoder. Additionally, the quantizer and the entropy encoder are shown as separate and independent configurations, but may be implemented as a single configuration.

The quantizer may receive the feature tensor and quantize it to generate a symbol tensor. In this case, the feature tensor may be data expressed in floating-point, and the symbol tensor may be data expressed in fixed-point. Here, the quantization size (or quantization step size) for quantization may be a predefined fixed value or may be signaled. Alternatively, the quantization size may be input from the user. As an example, the quantization size may be transmitted through a bitstream through entropy encoding. Alternatively, a fixed quantization size may be used according to an agreement between the quantizer and the dequantizer.

Alternatively, as an example, the quantization size may be determined based on encoding information. The encoding information may include at least one of the size of the feature tensor (or feature map), the number of channels included in the feature tensor, the compression method of the feature tensor, the layer structure (or type) of the current layer where the feature tensor is output, a layer structure of the previous layer of the current layer, a layer structure of the next layer of the current layer, or a bit rate.

Alternatively, when there are multiple feature tensors, quantization may be performed using different quantization sizes for each feature tensor. Additionally, as an example, grouping for a plurality of feature tensors may be performed, and quantization may be performed by applying the same quantization size to each feature tensor group. A feature tensor group may include a plurality of feature tensors. As an example, a feature tensor group may include a specific number of feature tensors. The specific number may be a predefined fixed value or a value encoded through a bitstream. Additionally, as an example, grouping of feature tensors may be performed based on the above-described encoding information. In this case, each quantization size may be included in the bitstream through entropy encoding and transmitted to a later step.

The entropy encoder may generate a bitstream by entropy encoding the input symbol tensor. In the entropy encoder, an arithmetic encoder using a plurality of symbols may be used for entropy encoding. Alternatively, a bitstream may be generated by binarizing the symbol tensor through a binary arithmetic encoder. The generated bitstream may be transmitted to the feature tensor decoder.

The feature tensor decoder may receive a bitstream as input and generate a reconstructed feature tensor. The feature tensor decoder may include an entropy decoder and a dequantizer. The feature tensor decoder shown in FIG. 2 is an example, and embodiments of the present disclosure are not limited thereto. The feature tensor decoder may additionally include another processor or other configurations in addition to the entropy decoder and the dequantizer. In addition, the decoder and the dequantizer are shown as separate and independent configurations, but may be implemented as a single configuration.

The entropy decoder may receive a bitstream as input and generate a reconstructed symbol tensor. The reconstructed symbol tensor generated by the entropy decoder may be transmitted to the dequantizer.

The dequantizer may receive the reconstructed symbol tensor and perform dequantization to generate a reconstructed feature tensor.

Figure 3:
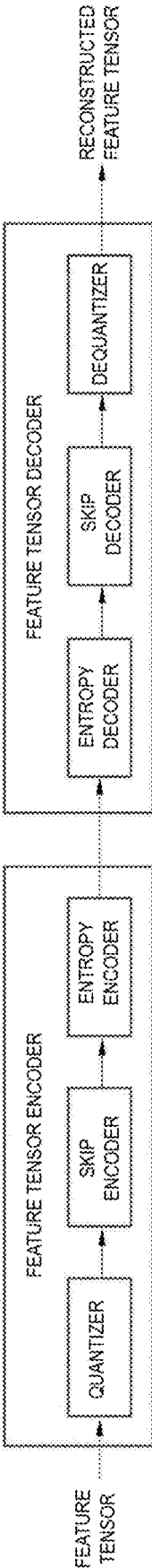
FIG. 3 is a block diagram showing an example of a feature tensor encoder and decoder using skip coding according to an embodiment of the present disclosure.

FIG. 3 is a block diagram showing an example of a feature tensor encoder and decoder using skip coding according to an embodiment of the present disclosure.

Referring to FIG. 3, the feature tensor encoder may include a quantizer, a skip encoder, and an entropy encoder. The feature tensor decoder may include an entropy decoder, a skip decoder, and a dequantizer. The feature tensor encoder and decoder shown in FIG. 3 are examples, and embodiments of the present disclosure are not limited thereto. For example, the feature tensor encoder may include other processors or other configurations in addition to the quantizer, the skip encoder, and entropy encoder. Additionally, the quantizer, the skip encoder, and the entropy encoder are shown as separate and independent configurations, but all or part of the configurations may be implemented as a single configuration. Likewise, the feature tensor decoder may include other processors or other configurations in addition to the entropy decoder, the skip decoder, and dequantizer. In addition, the entropy decoder, the skip decoder, and the dequantizer are shown as separate and independent configurations, but all or part of the configurations may be implemented as a single configuration.

The feature tensor encoder may receive a feature tensor as input and output a bitstream. The output bitstream may be transmitted to a feature tensor decoder.

Specifically, the quantizer may receive a feature tensor as input and quantize the feature tensor to generate a symbol tensor. The symbol tensor output by the quantizer may be referred to as a quantized feature tensor or a quantized feature map. The generated symbol tensor may be transmitted to the skip encoder. The quantizer of FIG. 3 may be the same as previously described in FIG. 2, and redundant description in relation to it will be omitted.

According to an embodiment of the present disclosure, the symbol tensor may be encoded selectively or hierarchically. In other words, entropy encoding for the symbol tensor may be performed selectively or hierarchically. In this disclosure, skip encoding and skip decoding may be collectively referred to as skip coding. Additionally, skip coding is not limited to its name and may also be referred to as compression coding, selective compression coding, hierarchical compression coding, bypass coding, etc.

Depending on whether skip encoding is performed on the symbol tensor, the skip encoder may transmit information compressed from the symbol tensor to the entropy encoder or transmit the received symbol tensor to the entropy encoder without compressing it.

Specifically, when skip encoding is performed, the skip encoder may receive a symbol tensor and perform skip encoding to generate a plurality of symbols from the symbol tensor. In this case, a plurality of symbols may include skip flags or symbol tensor values. The generated symbols may be transmitted to the entropy encoder.

Alternatively, when skip encoding is not performed, the skip encoder may transmit the input symbol tensor to the entropy encoder without performing skip encoding. In this case, information on whether skip encoding is performed may be additionally transmitted to the decoder through the entropy encoder.

Whether to perform skip encoding may be determined based on a variety of encoding information. As an example, whether to perform skip encoding may be determined based on the neural network structure. Alternatively, whether to perform skip encoding may be determined based on the structure or type of the neural network layer. For example, whether to perform skip encoding may be determined based on the type of the next layer. Here, the next layer represents the layer in the next order of the current layer based on the encoding process, and the current layer represents the layer where the current feature tensor is output. Additionally, a current symbol tensor that is subject to determination of whether to perform skip encoding may be generated through quantization of the current feature tensor.

Alternatively, for example, whether to perform skip encoding may be determined based on the type of the current layer and/or the next layer. As an example, whether skip encoding is performed may be predefined based on the type of the current layer and the next layer.

For example, when the type of the layer next to the layer in which the current symbol tensor is generated is a summation layer, skip encoding may be performed. As another example, when the layer in which the current symbol tensor is generated is not an upsampling layer and the type of the next layer is a summation layer, skip encoding may be performed. The symbol tensor in the above two cases may semantically be a residual tensor, and most symbol values may be 0. In this case, it may be determined to perform skip encoding because skip encoding has good coding efficiency. Alternatively, as an example, when the next layer is not a summation layer, it may be determined that skip encoding is not performed. Alternatively, as an example, when the current layer is an upsampling layer, it may be determined that skip encoding is not performed.

As another example, a neural network may be used to determine whether to perform skip encoding. For example, a symbol tensor may be input, a tensor for determining whether to perform skip encoding may be generated through a neural network including a plurality of neural network layers, and whether to perform skip encoding may be determined based on the values of the tensor. In other words, a tensor (or intermediate result, intermediate tensor, temporary tensor, feature tensor, temporary feature tensor, intermediate feature tensor) for determining whether to perform skip encoding may be generated from the input symbol tensor by the neural network, and whether to perform skip coding may be determined based on the generated tensor. Additionally, as an example, a tensor (intermediate result) of a neural network for determining whether to perform skip encoding may also be encoded, and the decoder may decode the encoded tensor, generate the tensor for determining whether to perform skip encoding, which is the same as the encoder through a neural network layer, and determine whether to perform skip coding using it.

Alternatively, whether to perform skip encoding may be determined by receiving information from the user.

The entropy encoder may receive symbols and perform entropy encoding to generate a bitstream. In this case, entropy encoding may be performed using different probability tables depending on the types of symbols. The generated bitstream may be transmitted to a feature tensor encoder.

The feature tensor decoder may receive a bitstream as input and generate a reconstructed feature tensor.

The entropy decoder may receive a bitstream and generate reconstructed symbols. The generated reconstructed symbols may be transmitted to the skip decoder.

The skip decoder may reconstruct the symbol tensor using the transmitted symbols. The reconstructed symbol tensor may be transmitted to the dequantizer.

The dequantizer may receive the reconstructed symbol tensor and perform dequantization to generate a reconstructed feature tensor.

Figure 4:
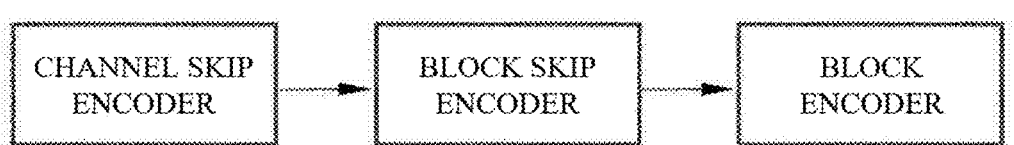
FIG. 4 is a block diagram showing an example of a skip encoder according to an embodiment of the present disclosure.

FIG. 4 is a block diagram showing an example of a skip encoder according to an embodiment of the present disclosure.

Referring to FIG. 4, the skip encoder may receive a symbol tensor and generate one or multiple symbols. The description of the skip encoder in FIG. 3 may be equally applied to this embodiment. Any redundant explanations related to this will be omitted. That is, the skip encoder shown in FIG. 4 may be an example of the skip encoder in FIG. 3.

As shown in FIG. 4, the skip encoder may include a channel skip encoder, a block skip encoder, and a block encoder. According to an embodiment of the present disclosure, skip encoding may be performed hierarchically on the symbol tensor. Whether to apply to the symbol tensor may be determined hierarchically.

The channel skip encoder may analyze the feature map for each channel of the input symbol tensor to classify into the channel to be encoded and the channel to be skipped, and may generate a symbol on whether to encode for each channel based on this. Alternatively, the channel skip encoder may determine whether to apply skip encoding for each channel of the symbol tensor and generate a symbol on whether to apply skip encoding. The generated symbol may be transmitted to the entropy encoder. Additionally, the feature map (or symbol tensor) of the channel that needs to be encoded may be transmitted to the block skip encoder.

The block skip encoder may divide the input feature map into a plurality of blocks, analyze each block, classify into a block to be encoded and a block not to be encoded, and generate a symbol for whether to perform encoding. The generated symbol may be transmitted to the entropy encoder. Additionally, blocks classified as blocks that need to be encoded may be transmitted to the block encoder.

As an example, the block encoder may divide each sample or symbol value within an input block into one or multiple sections and symbolize them. For example, multiple symbols may be generated for each symbol value, such as a case that it is 0, a case that it is greater than 0 and less than 2, a case that it is greater than 2 and less than 4, etc. Alternatively, block-unit encoding used in existing image and video codecs may be performed in the block encoder. Alternatively, a neural network-based codec may be used in the block encoder. The generated symbols may be transmitted to the entropy encoder.

Figure 5:
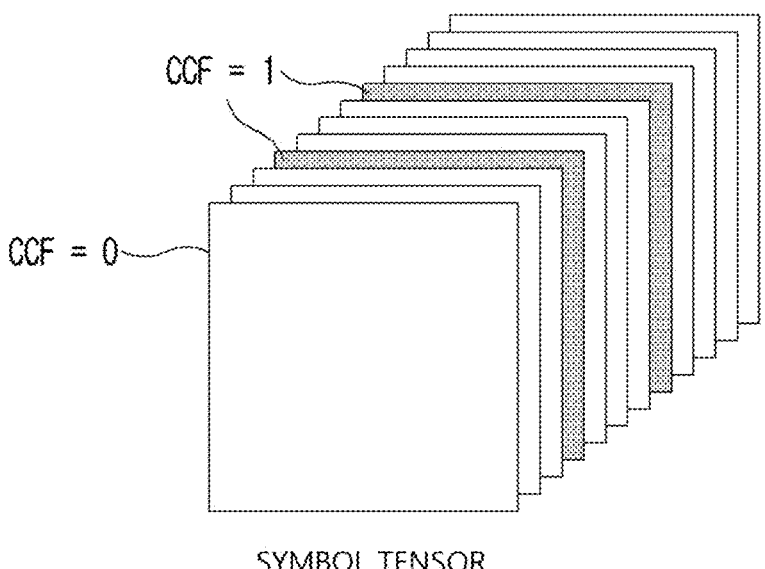
FIG. 5 shows an example of a channel skip encoder according to an embodiment of the present disclosure.

FIG. 5 shows an example of a channel skip encoder according to an embodiment of the present disclosure.

FIG. 5 is an example of expressing some channels as CCF (Channel Coded Flag) by performing channel skip encoding on the symbol tensor received from the skip encoder.

Referring to FIG. 5, the symbol tensor may consist of one or more channels. In FIG. 5, the unshaded channels refer to channels whose values are all 0, and the shaded channels refer to channels having at least one non-zero value. The CCF value for the unshaded channel may be determined as 0, and the CCF value for the shaded channel may be determined as 1.

In a neural network, a feature tensor with multiple channels may be generated by analyzing and classifying the features of the input image through multiple neural network layers. In this case, the classified channels may mean different characteristics. Depending on the input image, certain features may not exist in the image, and accordingly, the degree of activation of the feature tensor may be low. In this case, all values with low activation levels may be quantized to 0. Accordingly, some channels among a plurality of channels may have all symbol values of 0.

The skip encoder may check for each channel whether a symbol value exists within the channel and symbolize it as a CCF. For channels whose symbol values are all 0, the CCF may be expressed as 0, and for channels with at least one symbol value other than 0, the CCF may be expressed as 1. In other words, the CCF of a channel whose symbol values are all 0 may be set to 0, and the CCF of a channel including symbols other than 0 may be set to 1. Additionally, according to an embodiment of the present disclosure, the skip encoder may set the CCF to a predefined value for one or more predetermined channels among a plurality of channels included in the tensor. As an embodiment, the skip encoder may set the CCF of one or more predetermined channels among a plurality of channels to 0. The CCF of one or more predetermined channels may be individually signaled through a bitstream, or the encoder and the decoder may derive the same CCF without separate signaling. In the latter case, the one or more predetermined channels may be channels determined or defined by an agreement between the encoder and the decoder.

The one or more predetermined channels may be determined by various methods. As an example, the one or more predetermined channels may be determined as the remaining channels excluding the predefined number of channels among the plurality of channels. In other words, the CCF of a predefined number of lower priority channels among a plurality of channels may be set to 1. For example, assuming that the number of channels included in the tensor is 256, the encoding process is performed on the 128 channels with the higher priority, and the encoding process is skipped for the 128 channels with the lower priority except for 128 channels, so all CCF values may be set to 0. The number of higher priority channels on which encoding is performed or the number of lower priority channels on which skip encoding is performed may be a value fixed to the encoder and the decoder, or may be a value signaled from the encoder to the decoder.

Figure 6:
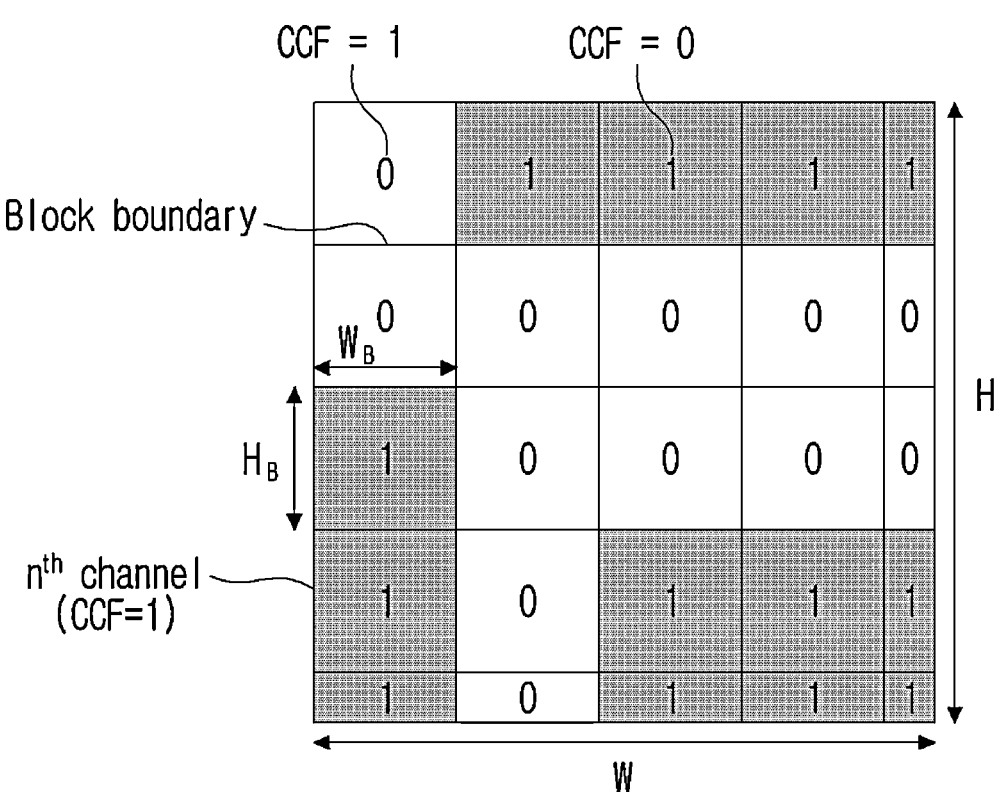
FIG. 6 shows an example of a block skip encoder according to an embodiment of the present disclosure.

Additionally, the order (or priority of channels) between a plurality of channels included in the tensor may be determined by the output of a neural network (or neural network layer). As an example, the order may be an encoding/decoding order. A neural network may be trained to sort channels included in a tensor by considering the relative importance, frequency, and energy compaction of the data (or symbols, coefficients) included in the channel. By sorting the channels (or feature maps) included in the tensor based on the trained neural network and skipping encoding/decoding for a certain number of lower priority channels based on the sorted order, signaling overhead can be significantly reduced and compression efficiency can be increased. FIG. 6 shows an example of a block skip encoder according to an embodiment of the present disclosure.

According to an embodiment of the present disclosure, skip encoding on the symbol tensor may be performed hierarchically. A CCF indicating whether to perform skip encoding may be determined for each channel of the symbol tensor. For a channel with a CCF of 1, whether to apply skip encoding may be determined on a block-by-block basis, which is the lower layer of the channel. In other words, block skip encoding may be performed on a channel whose CCF of the symbol tensor is 1.

Referring to FIG. 6, one channel of the symbol tensor may be referred to as a feature map. That is, the symbol tensor may be three-dimensional data and may include a plurality of channels of two-dimensional data. As shown in FIG. 6, the feature map may be an area whose horizontal and vertical lengths are W and H, respectively.

In one embodiment, for block skip encoding, the feature map may be divided into block units of a prefixed size. The block of the predefined size may be a block whose horizontal and vertical lengths are WB and HB, respectively. As an example, when the horizontal or vertical size of the feature map is not divisible by the horizontal or vertical size of the predefined blocks, the last block in each vertical or horizontal direction may be a block with a horizontal and vertical size smaller than WB and HB.

Alternatively, for block skip encoding, the feature map may be divided based on a tree structure. The tree structure may include quad tree, binary tree, and triple tree structures. When divided based on a tree structure, whether to divide further may be determined based on the values of symbols included in the corresponding block at each node. Alternatively, when divided based on a tree structure, it may be divided to a predefined depth. Information (or a flag) indicating whether all symbol values in the leaf nodes of the tree structure are 0 may be signaled.

In FIG. 6, an unshaded block may represent a block in which symbol (or coefficient, sample) values within the block are all 0, and a shaded block may represent a block in which one or more non-zero values exist within the block.

For each divided block, a CBF (Coded Block Flag) that expresses the presence or absence of a symbol value within the block may be generated and encoded. The CBF may be transmitted to the entropy encoder, entropy-encoded, and transmitted to the decoder.

In other words, whether to perform skip encoding may be determined for each channel of the symbol tensor. When no non-zero symbols (or coefficients, samples) are present in the channel, the channel skip coding flag (i.e., CCF) may be set to indicate that skip encoding is performed for the channel, and may be entropy encoded by the entropy encoder. When a non-zero symbol is present in the channel, the channel skip coding flag is set to indicate that skip encoding is not performed for the channel, and whether skip encoding is performed may be determined in units of blocks, which are the lower layers of the channel, which is the higher layer. When no non-zero symbol is present in the block, the block skip coding flag (i.e., CBF) may be set to indicate that skip encoding is performed on the block, and may be entropy encoded by the entropy encoder. When a non-zero symbol is present in the block, the block skip coding flag is set to indicate that skip encoding is not performed for the block, and may be individually encoded on a symbol-by-symbol basis in the block by the block encoder.

As an embodiment, between one neural network and an adjacent neural network, data expressed in various forms such as scalar value, vector, tensor, image, video, bitstream may be transmitted. As an example, the data may be transmitted between adjacent neural networks in the form of a tensor, which is three-dimensional data. Additionally, as an example, the tensor may be the feature tensor or symbol tensor previously described in FIGS. 1 to 6. Below, we will describe various partition structure-based tensor partitioning methods to increase compression efficiency.

Figure 7:
FIG. 7 is a block diagram showing an example of an inference apparatus using a tensor encoder/decoder according to an embodiment of the present disclosure.

FIG. 7 is a block diagram showing an example of an inference apparatus using a tensor encoder/decoder according to an embodiment of the present disclosure.

Referring to FIG. 7, an inference apparatus using a tensor encoder/decoder may receive an image as input and generate an inference result. The inference apparatus using the tensor encoder/decoder may include a first neural network, a tensor encoder, a tensor decoder, and a second neural network. The inference apparatus shown in FIG. 7 is an example, and embodiments of the present disclosure are not limited thereto. For example, the inference apparatus may include another neural network or another processors in addition to the first neural network, tensor encoder, tensor decoder, and second neural network, and some configurations may be omitted. Additionally, the first neural network, tensor encoder, tensor decoder, and second neural network are shown as separate and independent configurations, but may be implemented as a combination of all or part of the configurations.

In this case, the first neural network and the second neural network may be from dividing one neural network divided into two neural networks. Here, each neural network may include one or multiple neural network layers. In this case, the neural network layer may be a layer that performs operations such as convolution, summation, subtraction, multiplication, partitioning, etc. Alternatively, the neural network layer may be one of all activation function layers including the sigmoid, ReLU, leakyReLU, and GDN, which are activation functions. Alternatively, the neural network layer may be a batch normalization or generalized normalization layer that normalizes the tensor. Alternatively, the neural network layer may be an upsampling or downsampling layer. Alternatively, the neural network layer may be a pooling layer or an activation layer.

The first neural network may receive image as input and generate a feature tensor. The generated feature tensor may be transmitted to the tensor encoder. As an example, the feature tensor may be a result output from a neural network. The feature tensor may be an intermediate result output from a neural network, or it may be the final result.

The tensor encoder may receive a feature tensor and encode it to generate a bitstream. The generated bitstream may be transmitted to the tensor decoder.

The tensor decoder may receive a bitstream and perform decoding to reconstruct the feature tensor. The reconstructed feature tensor may be transmitted to a second neural network.

The second neural network may receive the reconstructed feature tensor as input and generate inference results.

Figure 8:
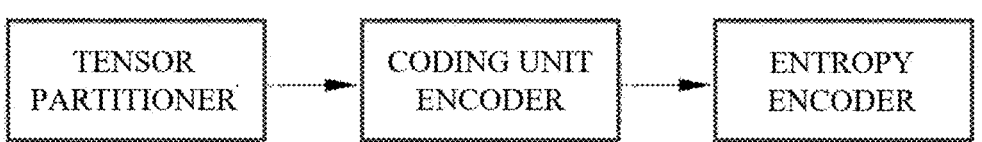
FIG. 8 shows an example of a tensor encoder according to an embodiment of the present disclosure.

FIG. 8 shows an example of a tensor encoder according to an embodiment of the present disclosure.

Referring to FIG. 8, the tensor encoder may include a tensor partitioner, a coding unit encoder, and an entropy encoder. The tensor encoder shown in FIG. 8 is an example, and embodiments of the present disclosure are not limited thereto. For example, the tensor encoder may include other configurations in addition to the tensor partitioner, coding unit encoder, and entropy encoder, and some configurations may be omitted. In addition, the tensor partitioner, coding unit encoder, and entropy encoder are shown as separate and independent configurations, but may be implemented as a combination of all or part of the configurations.

The tensor partitioner may receive a feature tensor and divide it into one or multiple coding units (or processing units). According to an embodiment of the present disclosure, various methods may be defined as methods for dividing a tensor. As an example, a tensor partitioning method may include octree partitioning, point unit partitioning, and channel unit partitioning. Octtree partitioning (or hierarchical octree partitioning) is described later in FIG. 10, point unit partitioning is described later in FIG. 11, and channel unit partitioning is described later in FIG. 12.

The information used for partitioning may be transmitted to the entropy encoder. One or multiple divided coding units may be transmitted to the coding unit encoder.

The coding unit encoder may generate a plurality of symbols by encoding the received coding unit. The generated symbols may be transmitted to the entropy encoder.

The entropy encoder may generate a bitstream by entropy encoding the received partitioning information and symbols.

Figure 9:
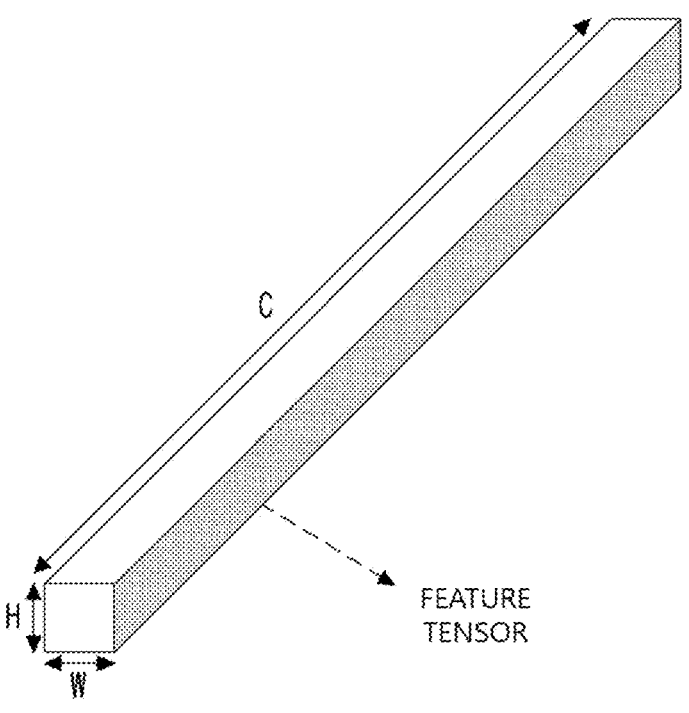
FIG. 9 shows an example of the form of a feature tensor according to an embodiment of the present disclosure.

FIG. 9 shows an example of the form of a feature tensor according to an embodiment of the present disclosure.

As described above, a feature tensor may be one-dimensional or more data, and may generally be data expressed as floating-point. Additionally, the feature tensor may be feature values generated through multiple neural network layers. And, values of the same channel may be interpreted as having the same characteristics.

Referring to FIG. 9, in one embodiment, the feature tensor may be expressed as three-dimensional data where the width, height, and channel lengths are W, H, and C, respectively, as shown in FIG. 9. In one example, W and H may be smaller than the horizontal and vertical sizes of the input image. Additionally, the number of channels C may have a relatively larger value than W and H.

Figure 10:
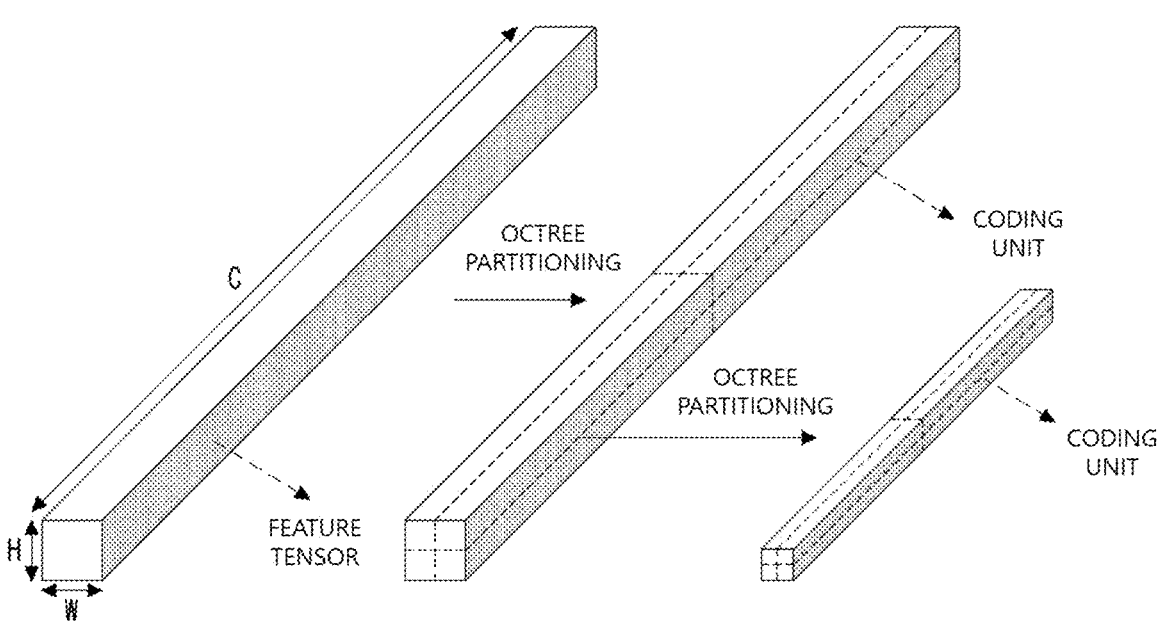
FIG. 10 shows an example of hierarchical octree partitioning of a feature tensor according to an embodiment of the present disclosure.

FIG. 10 shows an example of hierarchical octree partitioning of a feature tensor according to an embodiment of the present disclosure.

Referring to FIG. 10, the feature tensor, which is three-dimensional data, may be recursively 8-partitioned into an octree structure as shown in FIG. 10. The lower nodes of the octree divided from the higher node may be hierarchically partitioned again into the octtree structure.

In one embodiment, when the sample values included in each node in each layer are all 0, it may not be further partitioned. That is, when non-zero data does not exist within the lower node, additional partitioning may not be performed.

Alternatively, in one embodiment, whether to partition may be determined by analyzing the characteristics (or type) of the partitioned tensor, which is a node of each layer. For example, when any of the width, height, and number of channels of the node of each layer is smaller than a predefined threshold, it may be partitioned using a partitioning structure of a predefined structure other than an octrec. Alternatively, when any of the width, height, and number of channels of the node of each layer is smaller than a predefined threshold, it may be determined that no additional partitioning is performed. The predefined threshold may be 1, 2, 4 or an integer greater than 1.

In this case, partitioning information including whether to partition and the partitioning depth may be included in the bitstream through the entropy encoder and transmitted to the decoder. The last mode partitioned hierarchically, that is, the lowest node of the tree structure, may be determined as a coding unit, which is an encoder, and may be transmitted to the coding unit encoder.

Figure 11:
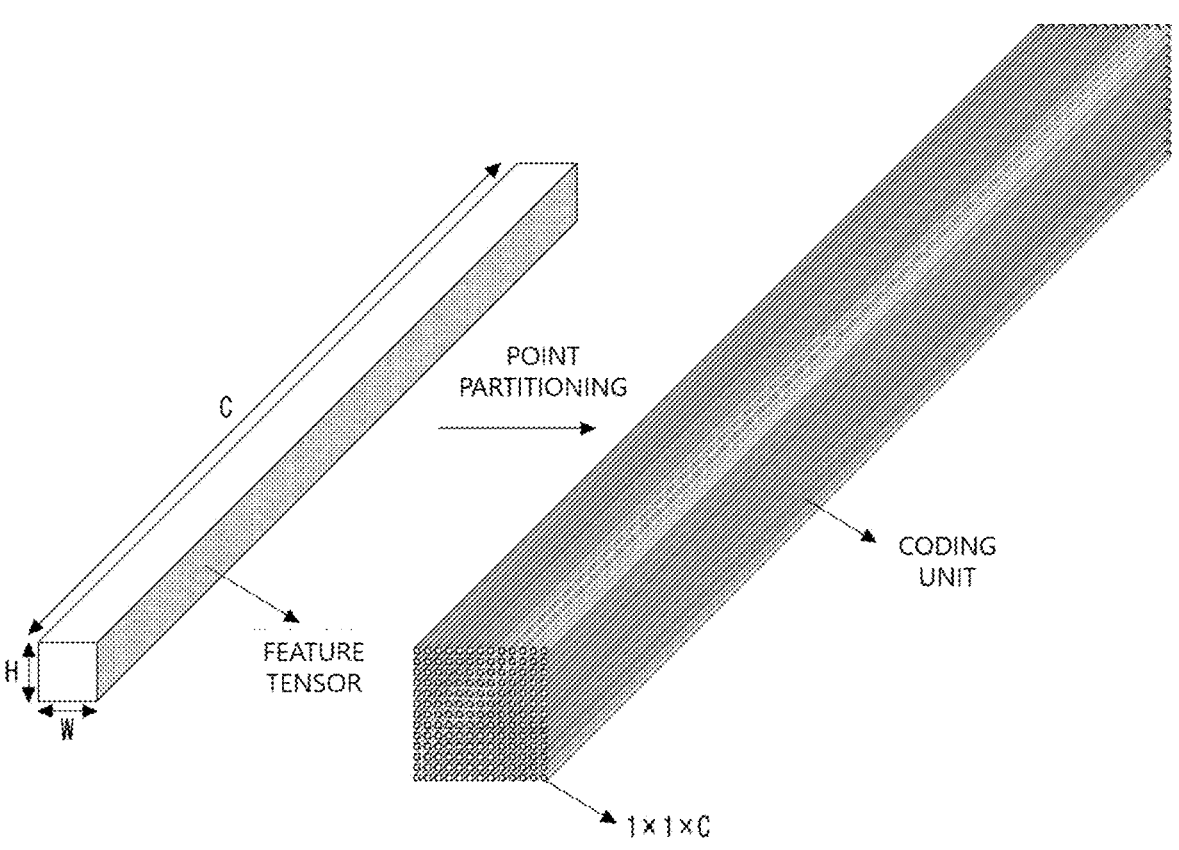
FIG. 11 shows an example of point unit partitioning of a feature tensor according to an embodiment of the present disclosure.

FIG. 11 shows an example of point unit partitioning of a feature tensor according to an embodiment of the present disclosure.

Referring to FIG. 11, the feature tensor, which is three-dimensional data, may have spatial width, height, and channel lengths of W, H, and C.

According to an embodiment of the present disclosure, for feature tensor encoding, the feature tensor may be partitioned in units of points. As shown in FIG. 11, point unit partitioning may be a method of partitioning into vector units having a spatial size of 1×1 and a length of C, which is the channel length.

Each partitioned vector may become one coding unit, and coding unit-wise encoding may be performed.

Figure 12:
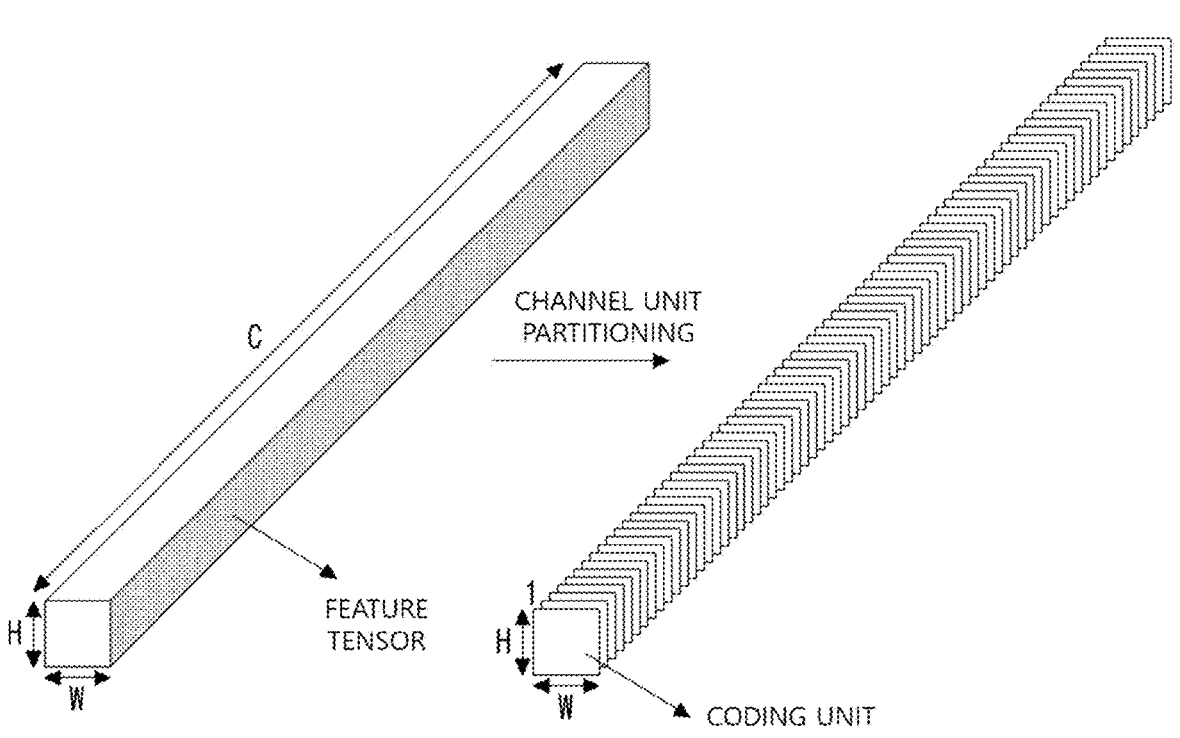
FIG. 12 shows an example of channel unit partitioning of a feature tensor according to an embodiment of the present disclosure.

FIG. 12 shows an example of channel unit partitioning of a feature tensor according to an embodiment of the present disclosure.

Referring to FIG. 12, the feature tensor may be three-dimensional data whose horizontal, vertical, and channel lengths are W, H, and C, respectively. Each channel of the feature tensor may mean a different feature (or feature map). Therefore, encoding/decoding may be performed for each of the same features to improve encoding efficiency.

According to an embodiment of the present disclosure, the feature tensor may be partitioned by channel. 3D data may be partitioned into 2D plane units. The feature map of the partitioned channel may be determined as one coding unit, and encoding/decoding may be performed based on this.

Figure 13:
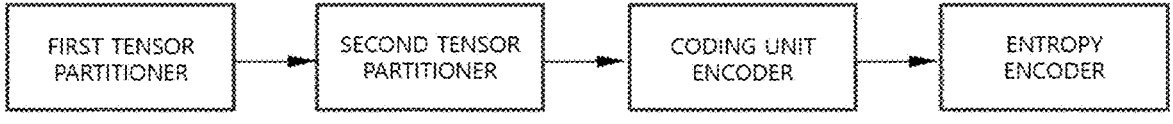
FIG. 13 shows an example of a tensor encoder according to an embodiment of the present disclosure.

FIG. 13 shows an example of a tensor encoder according to an embodiment of the present disclosure.

Referring to FIG. 13, the tensor encoder may include a first tensor partitioner, a second tensor partitioner, a coding unit encoder, and an entropy encoder. The tensor encoder shown in FIG. 13 is an example, and embodiments of the present disclosure are not limited thereto. For example, the tensor encoder may include other configurations in addition to the first tensor partitioner, the second tensor partitioner, the coding unit encoder, and the entropy encoder, and some configurations may be omitted. In addition, the first tensor partitioner, the second tensor partitioner, the coding unit encoder, and the entropy encoder are shown as separate and independent configurations, but may be implemented as a combination of all or part of the configurations.

According to an embodiment of the present disclosure, the tensor may be partitioned into a hierarchical structure. As an example, after tensor partitioning is performed based on a first partitioning structure, tensor partitioning may be performed, based on a second partitioning structure, on the tensor partitioned by the first partitioning structure.

Specifically, the first tensor partitioner may receive a feature tensor as input and partition the input feature tensor into one or multiple feature tensors based on the first partitioning structure. As an embodiment, the first partitioning structure may include at least one of a channel uniform partitioning structure based on the channel axis and a channel unit partitioning structure partitioned by channel. The case where the first partitioning structure is a channel uniform partitioning is described later in FIG. 14, and the case where the first partitioning structure is a channel unit partitioning structure is described later in FIGS. 15 and 16.

Partitioning information related to the first partitioning structure may be transmitted to the entropy encoder. Alternatively, partitioning information related to the first partitioning structure may be derived based on encoding information. One or more partitioned feature tensors may be transmitted to the second tensor partitioner.

The second tensor partitioner may partition the input partitioned feature tensor into one or multiple pieces based on the second partitioning structure. The partitioned tensor of the lower node of the second partitioning structure may be determined as a coding unit (or processing unit).

As an embodiment, the second partitioning structure may include at least one of an octree partitioning structure, a quadtree partitioning, and a spatially uniform partitioning. Alternatively, the second partitioning structure may be determined dependent on the first partitioning structure. For example, when channel axis uniform partitioning is performed in the first tensor partitioner, it may be determined as the octtree partitioning in the second tensor partitioner. Alternatively, when channel unit partitioning is performed in the first tensor partitioner, it may be determined as quadtree partitioning in the second tensor partitioner. Alternatively, when channel unit partitioning is performed in the first tensor partitioner, it may be determined as spatial uniform partitioning in the second tensor partitioner. The determined partitioning information may be included in a bitstream through the entropy encoder and transmitted to the decoder. Alternatively, partitioning information related to the second partitioning structure may be derived based on encoding information.

The generated coding units may be transmitted to the coding unit encoder.

The coding unit encoder may generate a plurality of symbols by encoding the received coding unit. The generated symbols may be transmitted to the entropy encoder.

The entropy encoder may generate a bitstream by entropy encoding the received partitioning information and symbols.

Figure 14:
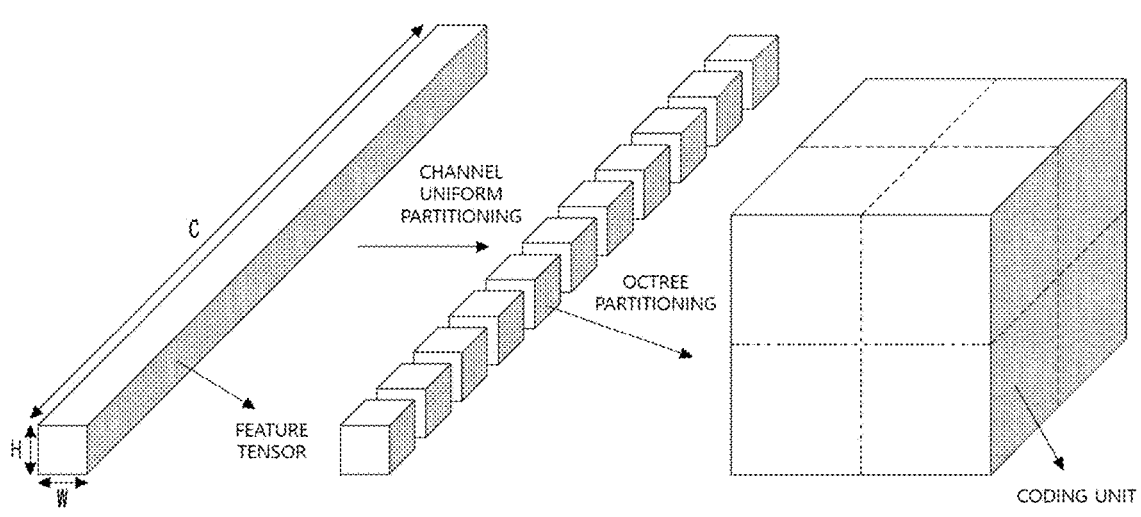
FIG. 14 shows an example of a feature tensor partitioning method based on a channel axis uniform partitioning structure and an octree partitioning structure according to an embodiment of the present disclosure.

FIG. 14 shows an example of a feature tensor partitioning method based on a channel axis uniform partitioning structure and an octree partitioning structure according to an embodiment of the present disclosure.

Referring to FIG. 14, the description will be made on the assumption that the first partitioning structure among the hierarchical partitionings is a channel axis uniform partitioning structure and the second partitioning structure is an octree partitioning structure. When channel axis uniform partitioning is performed, the feature tensor may be partitioned into tensors with the number of channels of the same size in specific units (or length) based on the channel axis. And, each partitioned feature tensor may be further partitioned hierarchically into an octree structure.

Nodes of the octree structure may be transmitted to the coding unit encoder as one coding unit. In one embodiment, octree nodes may have different sizes. Therefore, in the process of partitioning into an octree, whether to partition may be determined for each node. Whether to partition may be determined based on the results of analyzing each node. For example, when all values of a node are 0, it may be determined not to be further partitioned. Alternatively, when all values within a node have the same or similar values, it may not be partitioned. Alternatively, it may be determined based on the octree depth given as a user parameter.

Information related to the octree partitioning structure may be transmitted to the decoder through an entropy encoder.

Figure 15:
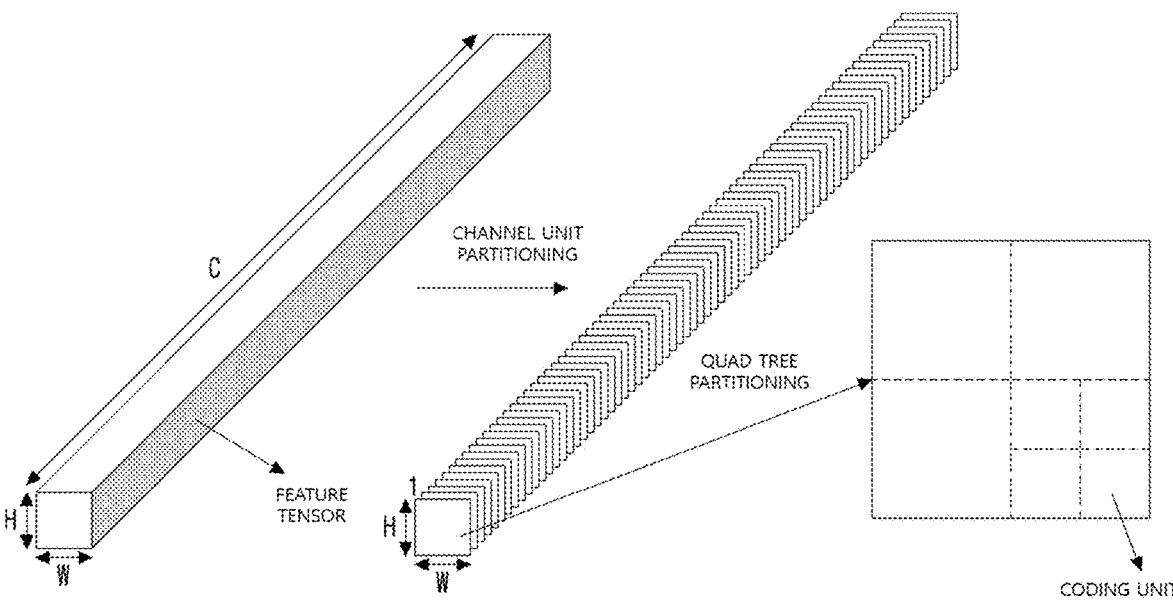
FIG. 15 shows an example of a feature tensor partitioning method based on a channel unit partitioning structure and a quadtree partitioning structure according to an embodiment of the present disclosure.

FIG. 15 shows an example of a feature tensor partitioning method based on a channel unit partitioning structure and a quadtree partitioning structure according to an embodiment of the present disclosure.

Referring to FIG. 15, in the first tensor partitioner, the feature tensor may be partitioned on a channel basis. The two-dimensional partitioned feature tensor may be a feature map. The first partitioning structure may be a channel unit partitioning structure. The feature map may be further partitioned into a quadtree structure in the second tensor partitioner. That is, the second partitioning structure may be a quadtree partitioning structure.

In one embodiment, for quadtree partitioning, the size of the minimum coding unit may be determined, and the partitioning depth may be predefined. For example, in quadtree partitioning, it may be partitioned up to the node size of 1×1. Alternatively, the partitioning depth may be determined by a depth parameter input from the user and partitioning may be performed based on the depth. Alternatively, in the process of partitioning into a quadtree, whether to partition may be determined by analyzing the feature map of each node.

Additionally, information related to the quadtree partitioning structure may be transmitted to the decoder through an entropy encoder.

Figure 16:
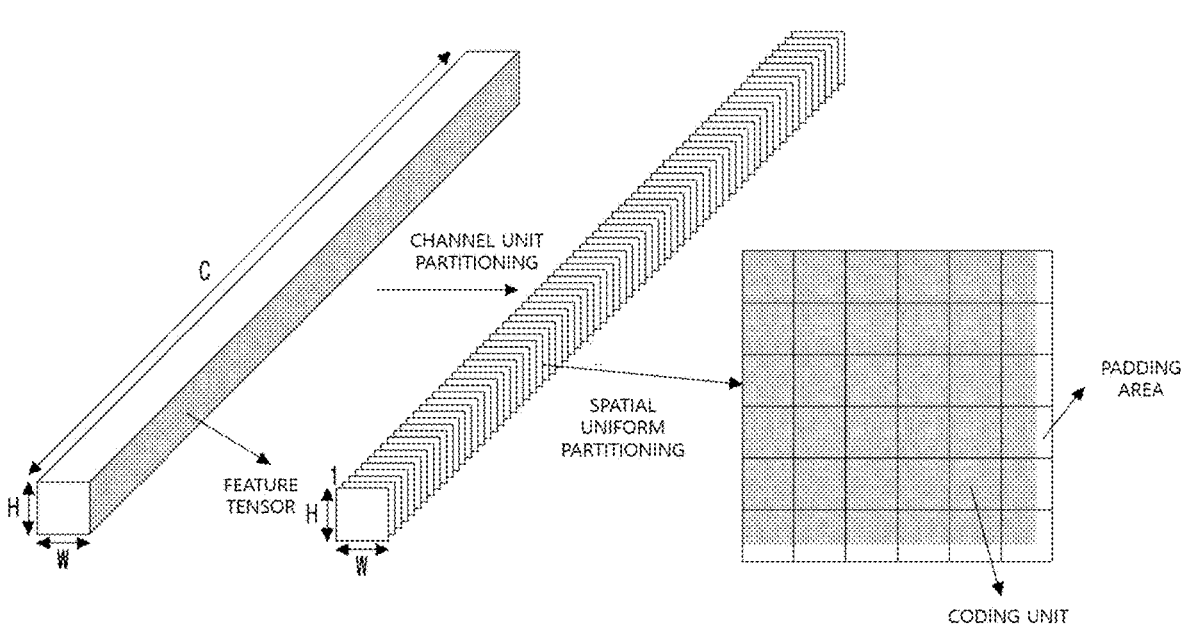
FIG. 16 shows an example of a feature tensor partitioning method based on a channel unit partitioning structure and an uniform partitioning structure according to an embodiment of the present disclosure.

FIG. 16 shows an example of a feature tensor partitioning method based on a channel unit partitioning structure and an uniform partitioning structure according to an embodiment of the present disclosure.

Referring to FIG. 16, it is assumed that the first partitioning structure is a channel unit partitioning structure and the second partition structure is a spatial uniform partitioning structure. The feature map partitioned by channel in the first tensor partitioner may be further spatial-uniform-partitioned in the second tensor partitioner. In this case, padding on the feature map may be performed for uniform partitioning.

The uniform partitioning size may be determined as a predefined size, or may be a value signaled from the encoder to the decoder.

The partitioned feature maps may be transmitted to the coding unit encoder.

Figure 17:
FIG. 17 is a block diagram showing an example of a tensor decoder according to an embodiment of the present disclosure.

FIG. 17 is a block diagram showing an example of a tensor decoder according to an embodiment of the present disclosure.

Referring to FIG. 17, the tensor decoder may receive a bitstream, decode the feature tensor, and generate a reconstructed feature tensor. The tensor decoder may include an entropy decoder, a tensor partitioner, and a coding unit decoder. The tensor decoder shown in FIG. 17 is an example, and embodiments of the present disclosure are not limited thereto. For example, the tensor decoder may include other configurations in addition to the entropy decoder, tensor partitioner, and coding unit decoder, and some configurations may be omitted. In addition, the entropy decoder, the tensor partitioner, and the coding unit decoder are shown as separate and independent configurations, but may be implemented as a combination of all or part of the configurations.

The entropy decoder may decode the input bitstream and reconstruct symbols. Among the reconstructed symbols, symbols related to the tensor partitioner may be transmitted to the tensor partitioner, and symbols related to coding unit decoding may be transmitted to the coding unit decoder.

The tensor partitioner may partition the tensor using the input symbols and generate coding units. The tensor partitioner may perform the same operation as the tensor partitioner of FIG. 8 and/or FIG. 13. Any redundant explanations related to this will be omitted.

The generated coding units may be transmitted to the coding unit decoder.

The coding unit decoder may reconstruct the coding units using the received coding unit and the reconstructed symbols to generate a reconstructed feature tensor.

Figure 18:
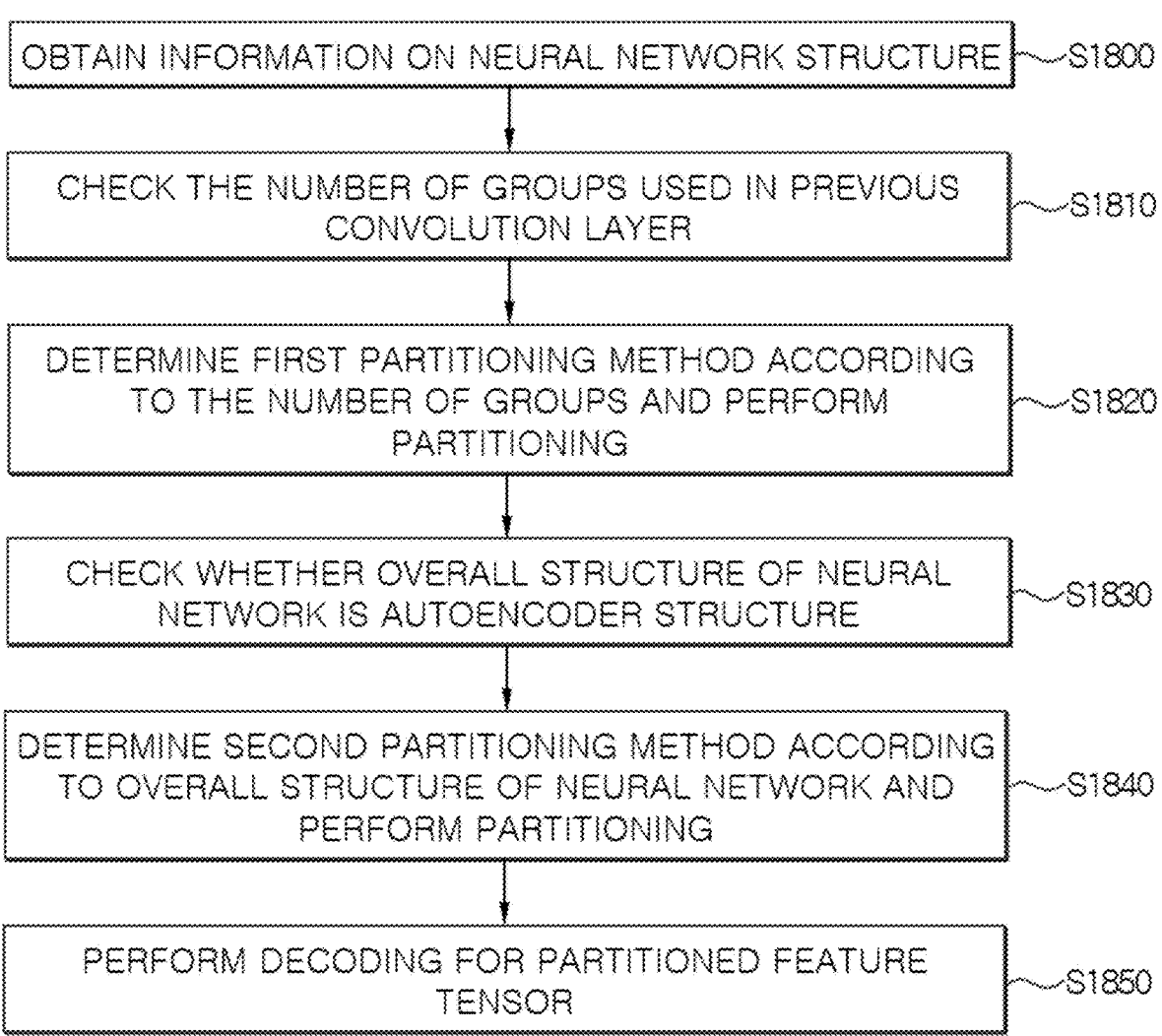
FIG. 18 shows a flowchart of a feature tensor partitioning method based on a neural network structure according to an embodiment of the present disclosure.

FIG. 18 shows a flowchart of a feature tensor partitioning method based on a neural network structure according to an embodiment of the present disclosure.

According to an embodiment of the present disclosure, the feature tensor partitioning method may be used adaptively according to the neural network structure. The description will focus on the case where the feature tensor partitioning method according to this embodiment is performed by a decoder, but the present invention is not limited thereto. That is, it may be applied in substantially the same way by a decoder. The feature tensor partitioning method of FIG. 18 is an example, and some steps may be omitted and other steps may be added.

In one embodiment, the partitioning method may be adaptively determined based on the layer type of the current layer, in which the current feature tensor was generated, and/or previous layer. For example, the partitioning method may be determined based on the number of groups of the convolution layer (e.g., the number of groups of the most recent convolution layer) among the current layer in which the feature tensor to be encoded/decoded is generated and/or the previous layer connected to the current layer. As an example, the partitioning structure or partitioning method may be determined based on the number of convolution layers or groups included in the current layer. For example, when the number of groups is 1, channel unit partitioning may be used in the first tensor partitioner.

Also, as an example, when the number of groups in the convolution layer is greater than 1 and less than the number of channels, the first tensor partitioner may use channel axis uniform partitioning whose unit is the length obtained by dividing the number of channels by the number of groups. Alternatively, when the number of groups of the convolution layer is equal to the channel length of the feature tensor, partitioning may not be performed in the first tensor partitioner. In the case of group convolution, the feature tensor may be generated using the same neural network filter for each group.

Referring to FIG. 18, the decoder may obtain information on the neural network structure (S1800).

In this case, as described above, the decoder may check the number of groups used in the previous convolution layer (S1810).

The decoder may determine a first partitioning method according to the number of groups and perform partitioning according to the determined method (S1820).

The decoder may check whether the overall structure of the neural network is an autoencoder structure (S1830). As an example, the second tensor partitioner may determine a partitioning method according to the overall structure of the neural network. For example, if the entire neural network uses an autoencoder structure to generate images with similar or different features from the input image, quadtree partitioning may be used in the second tensor partitioner because the importance according to spatial location may be different.

The decoder may determine a second partitioning method according to the overall structure of the neural network and perform partitioning according to the determined method (S1840).

The decoder may perform decoding for the partitioned feature tensor (S1850).

Coding efficiency may be improved by partitioning the generated feature tensor to fit the corresponding group and performing encoding/decoding. In addition, since the probability table or context used in the entropy encoding unit is updated and used in units of the feature tensor partitioned by the entropy encoder, entropy encoding/decoding of the currently partitioned feature tensor may be performed by referring to the probability value of the previous partitioned feature tensor in the encoding/decoding order.

As another example, if the entire neural network is a neural network for image recognition or object recognition, as the depth of the neural network layer becomes deeper, the spatial resolution gradually decreases and the concept of spatial location becomes weaker, so the importance according to spatial location may be uniform. Therefore, spatial uniform partitioning may be performed. In other words, the partitioning method may be determined depending on the type of neural network.

Alternatively, the partitioning method may be determined based on the ratio of the depth of the current layer in which the feature tensor to be encoded/decoded is generated and the depth of the entire neural network. For example, when the depth of the current layer is less than 0.5 of the total depth, quadtree partitioning may be performed, and when the depth of the current layer is greater than 0.5 of the total depth, uniform partitioning may be performed.

Embodiments described above may be a combination of components and features of the present disclosure in a predetermined form. Each component or feature should be considered selective unless explicitly stated otherwise. Each component or feature may be implemented in a form which is not combined with other component or feature. In addition, some components and/or features may be combined to configure an embodiment of the present disclosure. Order of operations described in embodiments of the present disclosure may be changed. Some configurations or features of an embodiment may be included in other embodiment or may be replaced with a configuration or a feature corresponding to other embodiment. It is obvious that claims without an explicit citation relationship in a scope of claims may be combined to configure an embodiment or may be included as a new claim by amendment after application.

An embodiment according to the present disclosure may be implemented by a variety of means, for example, hardware, firmware, software, or a combination thereof, etc. For implementation by hardware, an embodiment of the present disclosure may be implemented by one or more ASICs (application specific integrated circuits), DSPs (digital signal processors), DSPDs (digital signal processing devices), PLDs (programmable logic devices), FPGAs (field programmable gate arrays), processors, controllers, micro controllers, micro processors, etc.

In addition, for implementation by firmware or software, an embodiment of the present disclosure may be implemented in a form of a module, a procedure, a function, etc. performing functions or operations described above and may be recorded in a readable recoding medium through a variety of computer means. Here, a recording medium may include a program instruction, a data file, a data structure, etc. alone or in combination. A program instruction recorded in a recording medium may be those specially designed and configured for the present disclosure or those available by being notified to a person skilled in computer software. For example, a recording medium includes magnetic media such as a hard disk, a floppy disk and a magnetic tape, optical media such as CD-ROM (Compact Disk Read Only Memory) and DVD (Digital Video Disk), magneto-optical media such as a floptical disk and a hardware device which is specially configured to store and perform a program instruction such as ROM, RAM, a flash memory, etc. An example of a program instruction may include a high-level language code which may be executed by a computer by using an interpreter, etc. as well as a machine language code like what is made by a compiler. Such a hardware device may be configured to operate as at least one software module to perform an operation of the present disclosure and vice versa.

In addition, a device or a terminal according to the present disclosure may be driven by a command which causes at least one processor to perform functions and processes described above. For example, such a command may include, for example, an interpreted command like a script command such as a JavaScript or ECMAScript command, etc. or other commands stored in a computer readable medium readable or an executable code. Further, a device according to the present disclosure may be implemented in a distributed way across a network such as Server Farm or may be implemented in a single computer device.

In addition, a computer program which comes with a device according to the present disclosure and executes a method according to the present disclosure (also known as a program, software, a software application, a script or a code) may be written in any form of a programming language including a compiled or interpreted language or a priori or procedural language and may be deployed in any form including a stand-alone program, module, component or subroutine or other units suitable for use in a computer environment. A computer program does not necessarily correspond to a file of a file system. A program may be stored in a single file provided for a requested program, or in multiple interacting files (e.g., a file storing part of at least one module, subprogram or code), or in part of a file owning other program or data (e.g., at least one script stored in a markup language document). A computer program may be positioned in one site or distributed across a plurality of sites and may be deployed to be executed on one computer or multiple computers interconnected by a communication network.

It is obvious to a person skilled in the art that the present disclosure may be implemented in other specific form without departing from an essential feature of the present disclosure. Accordingly, the above-described detailed description should not be interpreted restrictively in all respects and should be considered illustrative. A scope of the present disclosure should be determined by reasonable interpretation of attached claims and all changes within an equivalent scope of the present disclosure are included in a scope of the present disclosure.

INDUSTRIAL AVAILABILITY

The present invention may be used in neural network-based image processing methods and devices.

The invention claimed is:

1. A neural network-based image processing method, comprising:
   obtaining a feature tensor from an input image using a first neural network including a plurality of neural network layers;
   obtaining a symbol tensor by performing quantization on the obtained feature tensor; and
   generating a bitstream by performing entropy encoding based on the symbol tensor,
   wherein generating the bitstream comprises selectively performing the entropy encoding by applying skip coding to the symbol tensor.

2. The method of claim 1, wherein when the skip coding is applied to the symbol tensor, the entropy encoding is skipped on all or part of a plurality of symbols included in the symbol tensor.

3. The method of claim 1, wherein generating the bitstream further comprises:
   determining whether to apply the skip coding to the symbol tensor.

4. The method of claim 3, wherein whether to apply the skip coding is determined based on a structure of the first neural network, a type of a first layer from which the feature tensor is output, a type of a second layer indicating a next layer of the first layer based on an encoding order, or a symbol included in the symbol tensor.

5. The method of claim 4, wherein when the type of the second layer is a summation layer, it is determined to apply the skip coding to the symbol tensor.

6. The method of claim 4, wherein when the type of the first layer is not an upsampling layer and the type of the second layer is a summation layer, it is determined to apply the skip coding to the symbol tensor.

7. The method of claim 3, wherein whether to apply the skip coding is determined using a second neural network including a plurality of neural network layers.

8. The method of claim 1, wherein generating the bitstream further comprises:
   determining whether to apply the skip coding to each of a plurality of channels included in the symbol tensor.

9. The method of claim 8, wherein when it is determined that the skip coding is applied to a current channel among the plurality of channels included in the symbol tensor, entropy encoding is performed on a skip coding flag indicating that the skip coding is applied to the current channel.

10. The method of claim 9, wherein generating the bitstream further comprises:
    when it is determined that the skip coding is not applied to the current channel, determining whether to apply the skip coding for each of a plurality of blocks included in the current channel.

11. The method of claim 10, wherein the plurality of blocks included in the current channel has a predefined fixed size.

12. The method of claim 1, wherein the feature tensor represents data expressed in floating-point, and the symbol tensor represents data expressed in fixed-point.

13. The method of claim 1, wherein the feature tensor is partitioned into a plurality of processing units based on a predefined partitioning structure, and
    wherein the predefined partitioning structure includes at least one of an octree partitioning structure, a point unit partitioning structure, a channel unit partitioning structure, or a hierarchical partitioning structure.

14. A neural network-based image processing device, comprising:
    a processor configured to control the image processing device; and
    a memory, coupled to the processor, configured to store data,
    wherein the processor is configured to:
    obtain a feature tensor from an input image using a first neural network including a plurality of neural network layers,
    obtain a symbol tensor by performing quantization on the obtained feature tensor, and
    generate a bitstream by performing entropy encoding based on the symbol tensor,
    wherein to generate the bitstream, the processor is configured to selectively perform the entropy encoding by applying skip coding to the symbol tensor.

* * * * *